United States Patent
Bhatia et al.

(10) Patent No.: US 10,509,409 B2
(45) Date of Patent: Dec. 17, 2019

(54) LOCAL TRAFFIC CUSTOMS LEARNING SYSTEM FOR AUTOMATED VEHICLE

(71) Applicant: Aptiv Technologies Limited, St. Michael (BB)

(72) Inventors: Gaurav Bhatia, Pittsburgh, PA (US); Jong Ho Lee, Pittsburgh, PA (US)

(73) Assignee: Aptiv Technologies Limited, St. Michael (BB)

( * ) Notice: Subject to any disclaimer, the term of this patent is extended or adjusted under 35 U.S.C. 154(b) by 233 days.

(21) Appl. No.: 15/499,415

(22) Filed: Apr. 27, 2017

(65) Prior Publication Data
US 2018/0314264 A1 Nov. 1, 2018

(51) Int. Cl.
| | |
|---|---|
| *G05D 1/02* | (2006.01) |
| *B60W 40/04* | (2006.01) |
| *G05D 1/00* | (2006.01) |
| *B60W 30/12* | (2006.01) |
| *G08G 1/01* | (2006.01) |
| *B60W 50/00* | (2006.01) |

(52) U.S. Cl.
CPC ........... *G05D 1/0221* (2013.01); *B60W 30/12* (2013.01); *B60W 40/04* (2013.01); *G05D 1/0088* (2013.01); *G05D 1/0231* (2013.01); *G08G 1/0112* (2013.01); *G08G 1/0133* (2013.01); *G08G 1/0145* (2013.01); *B60W 2050/0088* (2013.01); *B60W 2550/402* (2013.01)

(58) Field of Classification Search
CPC .. G05D 1/0221; G05D 1/0231; G05D 1/0088; B60W 30/12; B60W 30/165; B60W 30/18009; B60W 40/04
USPC .................................................. 701/27, 117
See application file for complete search history.

(56) References Cited

U.S. PATENT DOCUMENTS

| | | | |
|---|---|---|---|
| 2008/0056535 A1* | 3/2008 | Bergmann | ............. G01C 21/30 382/103 |
| 2012/0134532 A1 | 5/2012 | Ni et al. | |
| 2014/0324268 A1 | 10/2014 | Montemerlo et al. | |

(Continued)

FOREIGN PATENT DOCUMENTS

WO WO2016/120083 8/2016

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.

(Continued)

*Primary Examiner* — Nadeem Odeh
(74) *Attorney, Agent, or Firm* — Fish & Richardson P.C.

(57) ABSTRACT

A learning system for an automated vehicle to learn local traffic customs includes a location-detector, and object-detector, and a controller. The location-detector indicates a location of a host-vehicle on a digital-map. The object-detector detects a lane-marking and other-vehicles proximate to the host-vehicle. The controller is in communication with the location-detector and the object-detector. The controller is configured to determine when an observed-behavior of the other-vehicles is not in accordance with the lane-marking present at the location, and operate the host-vehicle in accordance with the observed-behavior.

8 Claims, 2 Drawing Sheets

(56) References Cited

U.S. PATENT DOCUMENTS

| | | |
|---|---|---|
| 2015/0057869 A1* | 2/2015 | Healey .................... G07C 5/00 |
| | | 701/23 |
| 2015/0154861 A1* | 6/2015 | Hillenbrand ......... G08G 1/0145 |
| | | 701/2 |
| 2015/0161455 A1 | 6/2015 | Osanai et al. |
| 2015/0166062 A1* | 6/2015 | Johnson ................ B60W 30/12 |
| | | 701/41 |
| 2015/0308837 A1* | 10/2015 | Cudak .................. G05D 1/0278 |
| | | 701/23 |
| 2015/0309512 A1* | 10/2015 | Cudak .................. G05D 1/0287 |
| | | 701/23 |
| 2016/0341555 A1 | 11/2016 | Laur et al. |
| 2018/0011497 A1* | 1/2018 | Schroeder ............ B62D 15/025 |
| 2018/0259957 A1* | 9/2018 | Charrow ............. G05D 1/0088 |

OTHER PUBLICATIONS

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

International Search Report and Written Opinion in International Application No. PCT/US2018/025041, dated Jul. 17, 2018, 11 pages.

* cited by examiner

LOCAL TRAFFIC CUSTOMS LEARNING SYSTEM FOR AUTOMATED VEHICLE

TECHNICAL FIELD OF INVENTION

This disclosure generally relates to a learning system for an automated vehicle, and more particularly relates to a system that learns local traffic customs when an observed-behavior of the other-vehicles is not in accordance with a lane-marking.

BACKGROUND OF INVENTION

It is known to program or configure an automated vehicle to determine a lane-position in a travel-lane or steer the automated vehicle according to lane-markings. However, in some instances local customs are followed by human-operators that violate a strict interpretation of what lane-markings indicate. It has been observed that these violations often improve the flow of traffic.

SUMMARY OF THE INVENTION

In accordance with one embodiment, a learning system for an automated vehicle to learn local traffic customs is provided. The system includes a location-detector, and object-detector, and a controller. The location-detector indicates a location of a host-vehicle on a digital-map. The object-detector detects a lane-marking and other-vehicles proximate to the host-vehicle. The controller is in communication with the location-detector and the object-detector. The controller is configured to determine when an observed-behavior of the other-vehicles is not in accordance with the lane-marking present at the location, and operate the host-vehicle in accordance with the observed-behavior.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
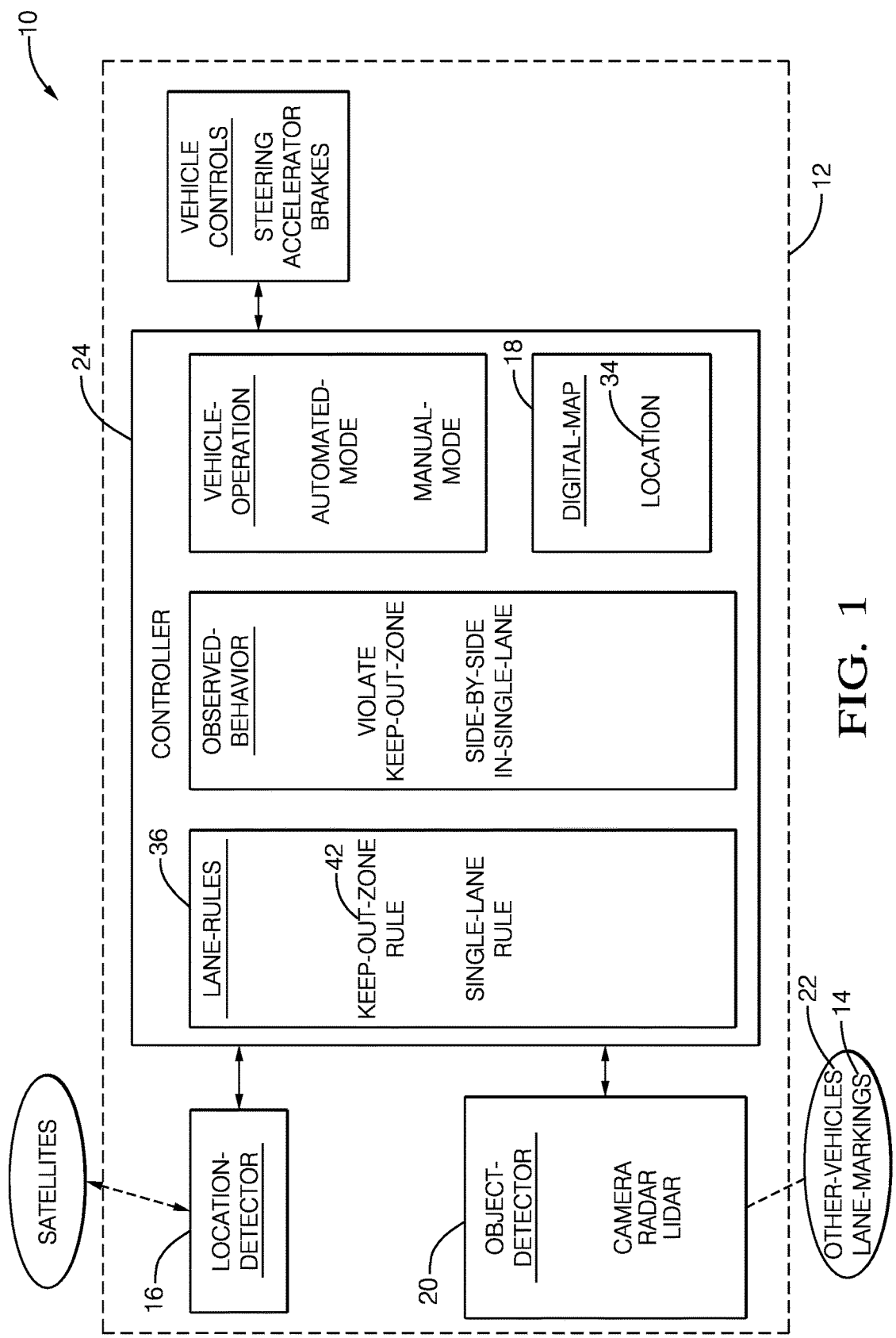
FIG. 1 is a diagram of learning system in accordance with one embodiment.

FIG. 1 illustrates a non-limiting example of a learning system 10, hereafter referred to as the system 10, which is suitable for use on an automated vehicle, for example a host-vehicle 12. As used herein, the term automated vehicle may apply to instances when the host-vehicle 12 is being operated in an automated-mode, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode where the degree or level of automation may be limited to temporarily deactivating a lane-departure-warning device when local driving customs are in conflict with lane-markings 14 (see also FIG. 2) on a roadway traveled by the host-vehicle 12.

The system 10 may include a location-detector 16 such as a global-positioning-system (GPS) receiver that indicates a location 34 or coordinates of the host-vehicle 12 on a digital-map 18 based on signals received from satellites. While the digital-map 18 is illustrated as being part of the host-vehicle 12, this is not a requirement. It is contemplated that the digital-map 18 could be stored 'in the cloud' and accessed using a variety of communications means such as Wi-Fi or cellular communications.

The system 10 also includes an object-detector 20 that the system 10 uses to detect the lane-markings 14 and other-vehicles 22 proximate to (e.g. within 200 meters of) the host-vehicle 12. The object-detector 20 may include, but is not limited to, a camera, a lidar, a radar, a wireless communications receiver—e.g. part of a vehicle to vehicle (V2V) transceiver, or any combination of these devices. If the object-detector 20 includes more than a single device, e.g. the combination of a camera and a radar, data-fusion techniques may be used to combine the information from the separate devices to more accurately determine, for example, the distance and/or the direction to each of the other-vehicles 22, as will be recognized by those in the art. The devices (camera, lidar, and/or radar) that form the object-detector 20 may be co-located in a unified housing as suggested in FIG. 1, or may be distributed at various positions about the host-vehicle 12, as will be recognized by those in the art.

The system 10 also includes a controller 24 that may be in communication with the location-detector 16 and the object-detector 20. The communication may be by way of, but is not limited to, wires, fiber-optics, or wireless communications. The controller 24 may include a processor (not specifically shown) such as a microprocessor or other control circuitry such as analog and/or digital control circuitry including an application specific integrated circuit (ASIC) for processing data as should be evident to those in the art. The controller 24 may include memory (not specifically shown), including non-volatile memory, such as electrically erasable programmable read-only memory (EEPROM) for storing one or more routines, thresholds, and captured data. The one or more routines may be executed by the processor to perform steps for operating the host-vehicle 12 in a variety of situations, non-limiting example of which will be described below.

Figure 2:
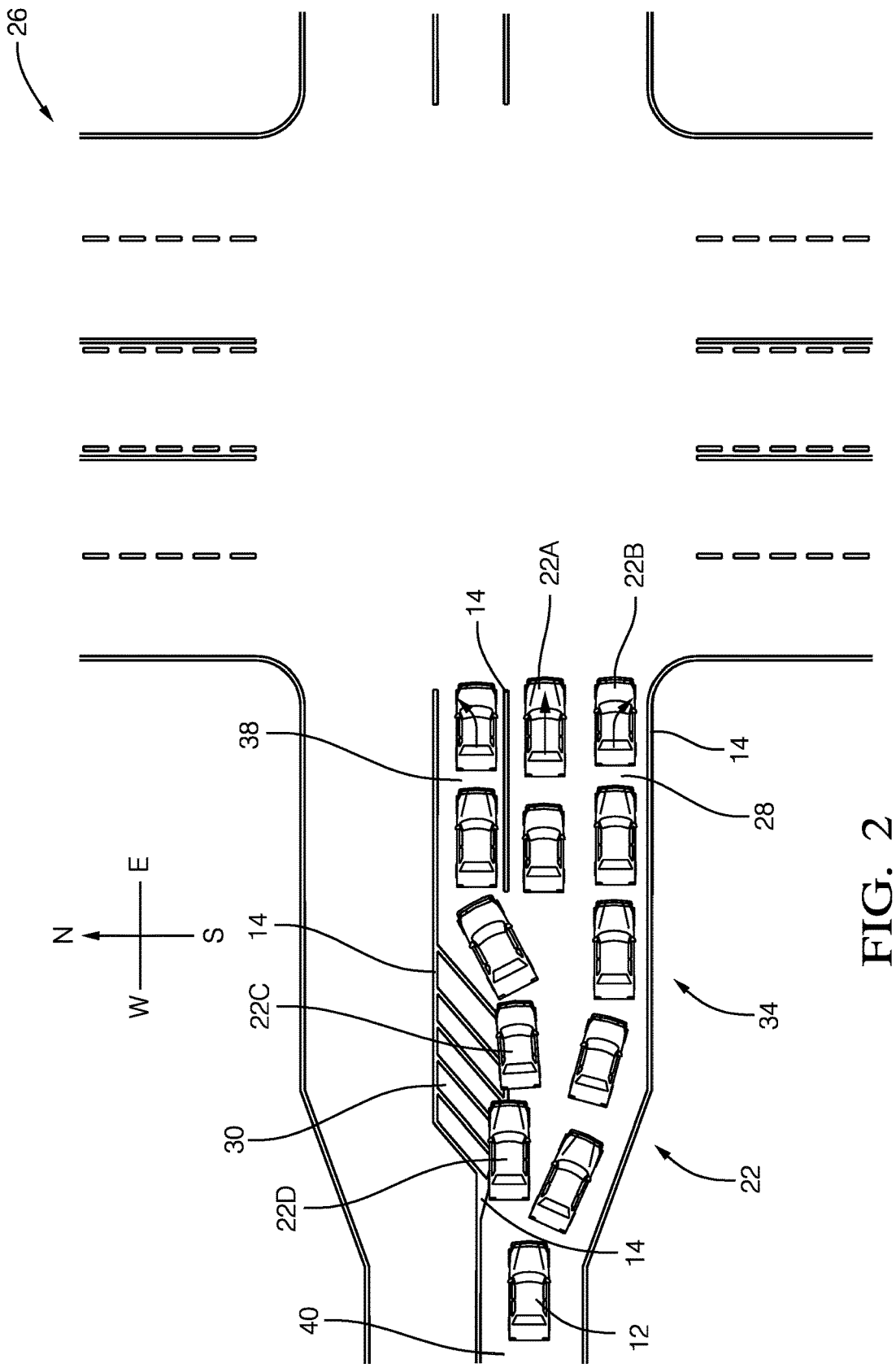
FIG. 2 is a traffic-scenario that may be encountered by the system of FIG. 1 in accordance with one embodiment.

FIG. 2 illustrates a non-limiting example of a traffic-scenario 26 where the host-vehicle and a number of the other-vehicles 22 that were traveling east are stopped at an intersection. That no other vehicles are illustrated as traveling in the other directions (e.g. north, south, and west) is only to simplify the illustration. It is pointed out that the east-west roadway has outside lanes (i.e. east-bound right-lane and west-bound right-lane) near the intersection that are wide enough to accommodate two automobile sized vehicles side-by-side, even though the lane-markings 14 designate a single lane 28. By contrast, the left-turn lanes of the east-west roadway on both sides of the intersection, and all of the travel-lanes of north-south roadway are single-vehicle width lanes. It has been observed that human-operators will often cooperate and bias their position in an oversized instance of the single-lane 28 so two vehicles may reside side-by-side as illustrated. By way of a specific example, if the other-vehicle 22A were first to arrive at the intersection and the other-vehicle 22A intended to travel straight through the intersection as indicated in FIG. 2, a human-operator may act in a courteous manner and bias the other-vehicle 22A towards the left side of the single-lane 28 so that the other-vehicle 22B could approach the intersection and optionally proceed with a right-turn, assuming that a right-turn on red is allowed. This cooperative behavior has the benefit of keeping traffic moving by making space so the remaining instances of the other-vehicles 22 might be able to move forward even though the traffic-signal (not shown) for eastbound traffic is illuminated red, thereby preventing the other-vehicle 22A from proceeding through the intersection.

It is also pointed out that the lane-markings 14 define or designate a keep-out-zone 30 that, presumably, vehicles are not supposed to drive over. However, as illustrated, the flow of traffic at the intersection may be improved by other-vehicle 22C and other-vehicle 22D driving in the keep-out-zone 30 so that the remaining instances of the other-vehicles 22 might be able to move forward as instances of the other-vehicles 22 (e.g. the other-vehicle 22B) completes the right-turn even though the traffic-signal is red. Prior examples of automated vehicles are configured or programmed to steer the automated vehicle to the center of a lane defined by the lane-markings 14, and avoid driving on the keep-out-zone 30 if the automated-vehicle is operated in the automated-mode. If the automated vehicle is being operated in the manual-mode, the lane-departure warning device may activate if the automated vehicle is steered by a human-operator over the keep-out-zone 30 or towards a position in a lane that is well off-center.

To overcome this problem, the system 10, or more specifically the controller 24, is programmed or otherwise configured to determine when an observed-behavior 32 of the other-vehicles 22 is not in accordance with the lane-marking 14 present at the location 34 being observed by the object-detector 20 of the host-vehicle. That is, the controller 24 learns or remembers the location 34 (i.e. records the GPS coordinates) of the intersection, for example, where violation of lane-rules is observed. Then the controller 24 operates the host-vehicle 12 in accordance with the observed-behavior 32 rather than rigidly following the lane-rules 36 that may have been previously established as a default condition for operating the host-vehicle 12.

By way of further example and in accordance with a scenario discussed above, when the lane-marking 14 indicates the keep-out-zone 30 that precedes a turn-lane 38 adjacent to a travel-lane 40 of the host-vehicle 12, and the observed-behavior 32 includes the other-vehicles 22 traveling over the keep-out-zone 30 (i.e. violating the keep-out-zone 30) to access the turn-lane 38, then the controller 24 may ignore a keep-out-zone rule 42 of the lane-rules 36. That is, if the system 10 observes that the keep-out-zone rule 42 is violated by the other-vehicles 22, and optionally this example of the observed-behavior 32 is observed on multiple occasions, then the system 10 'remembers' the local traffic custom for the location 34 for future occasions when the host-vehicle is at the location 34.

By way of further example and in accordance with another scenario discussed above, when the lane-marking 14 indicates a single-lane 28 at an intersection, and the observed-behavior 32 includes two of the other-vehicles 22 (e.g. the other-vehicle 22A and the other-vehicle 22B) positioned side-by-side in the single-lane 28 as shown in FIG. 2, the controller 24 may ignore a single-lane rule 44 and instead operate in accordance with the observed-behavior 32 and similarly operate side-by-side with an instance of the other-vehicles 22, e.g. the other-vehicle 22A, if possible. That is, if the other-vehicle 22B and instance of the other-vehicles 22 behind the other-vehicle 22B all complete right turns, the host-vehicle 12 may advance to a position next to the other-vehicle 22A, and also complete a right-turn if that is in accordance with the route of the host-vehicle 12.

Accordingly, a learning system for an automated vehicle (the system 10), a controller 24 for the system 10, and a method of operating the system 10 is provided. By observing location traffic customs that seem to violate the lane-rules 36 but in some instances improve the flow of traffic, the system 10 is makes best use of roadway features to also help improve the flow of traffic.

While this invention has been described in terms of the preferred embodiments thereof, it is not intended to be so limited, but rather only to the extent set forth in the claims that follow.

We claim:

1. A system comprising:
   a location-detector that determines a location of an automated vehicle;
   an object-detector that detects a lane-marking and one or more other-vehicles proximate to the automated vehicle; and
   a controller in communication with the location-detector and the object-detector, the controller configured to:
      determine whether the lane-marking indicates a keep-out zone that precedes a turn-lane adjacent to a travel-lane of the automated vehicle;
      determine whether at least one of the one or more other-vehicles has traveled over the keep-out zone; and
      in accordance with determining that the lane-marking indicates the keep-out zone that precedes the turn-lane adjacent to the travel-lane of the automated vehicle, and that the at least one of the one or more other-vehicles has traveled over the keep-out zone, record the location of the automated vehicle and an indication that a lane-rule is violated at the location; and
      operate the automated vehicle to travel over the keep-out zone in violation of the lane-rule.

2. The system of claim 1, wherein the recording occurs only after the lane-rule is violated at the location multiple times.

3. A system comprising:
   a location-detector that determines a location of an automated vehicle;
   an object-detector that detects a lane-marking and two or more other-vehicles proximate to the automated vehicle; and
   a controller in communication with the location-detector and the object-detector, the controller configured to:
      determine whether the lane-marking indicates a single-lane at an intersection;
      determine whether the two or more other-vehicles are positioned side-by-side in the single-lane;
      determine whether at least one of the two or more other-vehicles completes a right-turn from the single-lane; and
      in accordance with determining that the lane-marking indicates the single-lane at the intersection, that the two or more other-vehicles are positioned side-by-side in the single-lane, and the at least one of the two or more other-vehicles completes the right-turn from the single-lane,
         record the location of the automated vehicle and an indication that a lane-rule is violated at the location; and
         operate the automated vehicle to make a right-turn from the single-lane in violation of the lane-rule.

4. The system of claim 3, wherein the recording occurs only after the lane-rule was violated at the location multiple times.

5. A method comprising:
   determining, using a location-detector, a location of an automated vehicle;
   detecting, using an object-detector, a lane-marking and one or more other-vehicles proximate to the automated vehicle;
   determining, using a controller, whether the lane-marking indicates a keep-out zone that precedes a turn-lane adjacent to a travel-lane of the automated vehicle;
   determining, using the controller, whether at least one of the one or more other-vehicles has traveled over the keep-out zone; and
   in accordance with determining that the lane-marking indicates the keep-out zone that precedes the turn-lane adjacent to the travel-lane of the automated vehicle, and that the at least one of the one or more other-vehicles has traveled over the keep-out zone,
      recording the location of the automated vehicle and an indication that a lane-rule was violated at the location; and
      operating the automated vehicle to travel over the keep-out zone in violation of the lane-rule.

6. The method of claim 5, wherein the recording occurs only after the lane-rule was violated at the location multiple times.

7. A method comprising:
   determining, using a location-detector, a location of an automated vehicle;
   detecting, using an object-detector, a lane-marking and two or more other-vehicles proximate to the automated vehicle;
   determining, using a controller, whether the lane-marking indicates a single-lane at an intersection;
   determining, using the controller, whether the two or more other-vehicles are positioned side-by-side in the single-lane;
   determining, using the controller, whether at least one of the two or more other-vehicles completes a right-turn from the single-lane; and
   in accordance with determining that the lane-marking indicates the single-lane at the intersection, that the two or more other-vehicles are positioned side-by-side in the single-lane, and that the at least one of the two or more other-vehicles completes the right-turn from the single-lane,
      recording the location of the automated vehicle and an indication that a lane-rule is violated at the location; and
      operating the automated vehicle to make a right-turn from the single-lane in violation of the lane-rule.

8. The method of claim 7, wherein the recording occurs only after the lane-rule was violated at the location multiple times.

* * * * *